United States Patent
Nara et al.

(10) Patent No.: US 7,519,072 B2
(45) Date of Patent: Apr. 14, 2009

(54) TRANSMISSION SYSTEM INCLUDING MEDIA CONVERTER FOR CONCENTRATED VDSL APPARATUS

(75) Inventors: Masaki Nara, Yokohama (JP); Naoko Nagasaki, Yokohama (JP); Takahito Yuda, Fujisawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 616 days.

(21) Appl. No.: 11/196,595

(22) Filed: Aug. 4, 2005

(65) Prior Publication Data
US 2006/0104304 A1 May 18, 2006

(30) Foreign Application Priority Data
Nov. 18, 2004 (JP) ............................. 2004-334224

(51) Int. Cl.
*H04L 12/56* (2006.01)
(52) U.S. Cl. .................. 370/401; 370/463; 370/420; 370/441
(58) Field of Classification Search ............... 370/463, 370/467, 252, 401, 420, 441
See application file for complete search history.

(56) References Cited

U.S. PATENT DOCUMENTS

| | | | | |
|---|---|---|---|---|
| 5,688,857 A | * | 11/1997 | Chen et al. .................. 524/590 |
| 5,905,781 A | * | 5/1999 | McHale et al. ............ 379/93.14 |
| 6,195,364 B1 | * | 2/2001 | Brodigan ..................... 370/463 |
| 6,754,233 B1 | * | 6/2004 | Henderson et al. .......... 370/493 |
| 7,224,672 B2 | * | 5/2007 | Arai ............................ 370/252 |
| 7,406,042 B1 | * | 7/2008 | Shridhar et al. ............. 370/230 |
| 2003/0118172 A1 | * | 6/2003 | Dendou ........................ 379/242 |
| 2006/0117364 A1 | * | 6/2006 | Vitenberg .................... 725/111 |

FOREIGN PATENT DOCUMENTS

JP 06-318955 11/1994

* cited by examiner

*Primary Examiner*—Ricky Ngo
*Assistant Examiner*—Dewanda Samuel
(74) *Attorney, Agent, or Firm*—Mattingly, Stanger, Malur & Brundidge, P.C.

(57) ABSTRACT

A transmission system comprising a relaying apparatus and concentrated subscriber line transmission apparatuses, the relaying apparatus including a first buffer memory for buffering a control request to be transmitted to one of the concentrated subscriber line transmission apparatuses, a second buffer memory for buffering data to be downloaded to specific one of the concentrated subscriber line transmission apparatuses, and a control unit for generating maintenance frames each including a control request, and download frames each including download data, and transmitting these frames to one of the concentrated subscriber line transmission apparatuses, selectively. The control unit controls the transmission of download frames, depending on status of traffic of frames being relayed from the communication network toward one of the concentrated subscriber line transmission apparatuses and on whether a control request awaiting transmission is buffered.

6 Claims, 9 Drawing Sheets

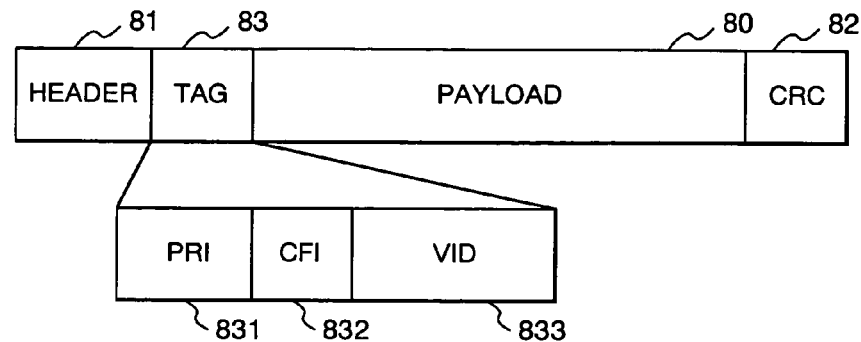
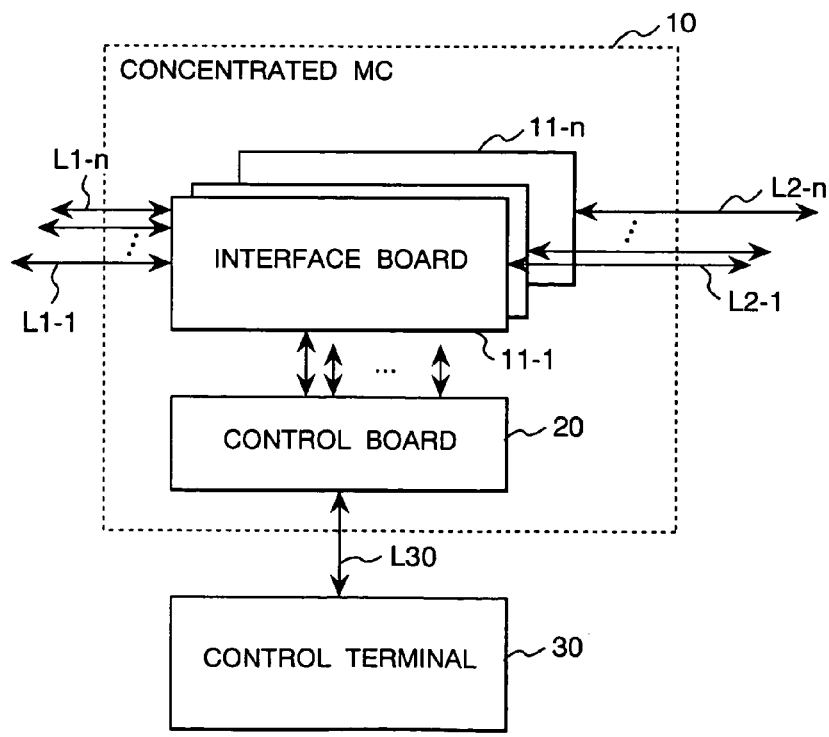

CONCENTRATED VDSL APPARATUS 40-1

TRANSMISSION SYSTEM INCLUDING MEDIA CONVERTER FOR CONCENTRATED VDSL APPARATUS

CLAIM OF PRIORITY

The present application claims priority from Japanese application serial No. 2004-334224, filed on Nov. 11, 2004, the content of which is hereby incorporated by reference into this application.

BACKGROUND OF THE INVENTION (1) Field of the Invention

The present invention relates to a transmission system and, more particularly, to a transmission system comprising concentrated subscriber line transmission apparatuses, each accommodating a plurality of user terminals, and a relaying apparatus located between the concentrated subscriber line transmission apparatuses and a communication network.

(2) Description of Related Art

In an apartment house where a number of Internet users reside, to simplify the configuration of access lines between user terminals and the Internet network, one or more concentrated subscriber line transmission apparatuses accommodating a plurality of user terminals are located and each of the concentrated subscriber line transmission apparatuses is connected to a relaying apparatus located at a switching station by a high speed transmission line of an optical fiber.

In this case, each of the concentrated subscriber line transmission apparatuses converts upward communication frames (or packets) received from the plurality of user terminals into optical signals and multiplexes the optical signals on a same optical fiber. The signal relaying apparatus forwards the communication frames received from each concentrated subscriber line transmission apparatus to the Internet network after converting the received frames from optical signals into electric signals. The signal relaying apparatus also forwards downward communication frames received from the Internet network to the concentrated subscriber line transmission apparatuses after converting the received frames from electric signals into optical signals. Each concentrated subscriber line transmission apparatus converts the communication frames received from the signal relaying apparatus from optical signals into electric signals and forwards the received communication frame to a subscriber line specified by the destination address of the frame.

In this specification, the relaying apparatus that accommodates a plurality of concentrated subscriber line transmission apparatuses and forwards received frames or packets after performing optical-electric conversion or electric-optical conversion of the frames, as above, is referred to as a "concentrated media converter (MC)". A high-speed concentrated subscriber line transmission apparatus to be connected to the above concentrated MC via an optical fiber line is referred to as a "concentrated VDSL (Very high bit-rate Digital Subscriber Line) apparatus."

A control terminal is connected to the concentrated MC to monitor the status of each concentrated VDSL apparatus. An operator can transmit a control frame (or control packet) from the control terminal to each of concentrated VDSL apparatuses. In response to the control frame, each of the VDSL apparatuses generates a notification frame indicating its status and transmits the notification frame to the control terminal. In this relation, because it is disadvantageous from a cost perspective to lay additional communication lines dedicated for performing monitoring control between the concentrated MC and concentrated VDSL apparatuses, an in-channel transmission is preferably adopted to share the optical fiber as the main signal line for the purpose of communicating maintenance frames such as control frames and status notification frames between the concentrated MC and concentrated VDSL apparatuses.

In the case of adopting the in-channel transmission, transmission of maintenance frames must be controlled not to obstruct the transmission of user frames as the main signals. For this purpose, for example, according to Japanese Unexamined Patent Publication No. H6(1994)-318955, transmission/reception buffers for user frames are monitored so that maintenance frames are transmitted according to the situation of network bandwidth usage.

SUMMARY OF THE INVENTION

A network access system such as the above concentrated VDSL apparatus requires firmware version-up at times for system specification change. Downloading firmware to the concentrated VDSL apparatus can be performed via the concentrated MC from the control terminal. A large amount of data is transferred in firmware download from the concentrated MC to a concentrated VDSL apparatus. If firmware download is preferentially performed, therefore, it causes adverse effects on monitoring control and the transmission of main signal frames by the concentrated MC.

An object of the present invention is to enable in a transmission system comprising concentrated subscriber line transmission apparatuses like the above concentrated VDSL apparatuses and a relaying apparatus like the concentrated MC, the relaying apparatus to download firmware to the concentrated subscriber line transmission apparatuses without causing adverse effects on the monitoring control and the transmission of main signal frames.

In order to achieve the above object, a transmission system according to the present invention comprises a plurality of concentrated subscriber line transmission apparatuses, each accommodating a plurality of user terminals, and a relaying apparatus located between the concentrated subscriber line transmission apparatuses and a communication network, wherein the relaying apparatus includes a first buffer memory for buffering control requests to be transmitted to the concentrated subscriber line transmission apparatuses, a second buffer memory for buffering download data to be transmitted to one of the concentrated subscriber line transmission apparatuses, and a control unit for generating a maintenance frame including a control request read out from the first buffer memory, and download frames each including download data read out from the second buffer memory, and transmitting these frames to specific one of the concentrated subscriber line transmission apparatuses, selectively.

The control unit controls the transmission of the download frames, depending on the status of traffic of communication frames being relayed from the communication network toward specific one of the concentrated subscriber line transmission apparatuses and on the buffering status of control requests awaiting transmission in the first buffer memory.

More specifically, control requests and download data output from a control terminal connected to the relaying apparatus are buffered into the first and second buffer memories, respectively. The control terminal divides, for example, firmware to be installed on specific one of concentrated subscriber line transmission apparatuses into a plurality of blocks and outputs firmware data block by block as the download data. The control unit of the relaying apparatus awaits receiving a response frame transmitted from one of concentrated subscriber line transmission apparatuses in response to a download frame previously transmitted thereto and determines the timing to transmit a next download frame after the response frame has been received. Upon completion of downloading one block of firmware data supplied from the control terminal, the control unit notifies the control terminal of the completion and receives the next block of download data from the control terminal.

In one embodiment of the present invention, the relaying apparatus comprises an interface board for relaying communication frames between the concentrated subscriber line transmission apparatuses and the communication network, and a control board connected to the interface board. The first and second buffer memories and the control unit are mounted on the control board.

The interface board comprises an upward signal processing circuit for relaying upward communication frames from the concentrated subscriber line transmission apparatuses to the communication network, a downward signal processing circuit for relaying downward communication frames from the communication network to the concentrated subscriber line transmission apparatuses, and a status monitor for detecting status of traffic of downward communication frames. The control unit determines timing to transmit the download frames, depending on the status of traffic detected by the status monitor and on the buffering status of control requests awaiting transmission in the first buffer memory.

The relaying apparatus can be equipped with a plurality of interface boards prepared for each of the concentrated subscriber line transmission apparatuses individually. In this case, the control unit mounted on the control board delivers the maintenance frame and download frame to one of the plurality of interface boards, selectively.

According to the present invention, a large amount of data (firmware) can be downloaded to each of the concentrated subscriber line transmission apparatuses without obstructing monitoring and control of the concentrated subscriber line transmission apparatus by the control terminal. Further, firmware version-up on each concentrated subscriber line transmission apparatus can be performed without obstructing network access from the concentrated subscriber line transmission apparatuses.

BRIEF DESCRIPTION OF THE DRAWINGS

FIG. 2A illustrates a format of an Ethernet frame for main signal transmission, which is used in the transmission system of FIG. 1.

FIG. 2B illustrates a format of an Ethernet frame for communicating maintenance data.

FIG. 3 shows a configuration of a concentrated MC 10 shown in FIG. 1.

DETAILED DESCRIPTION OF THE PREFERRED EMBODIMENTS

Figure 1:
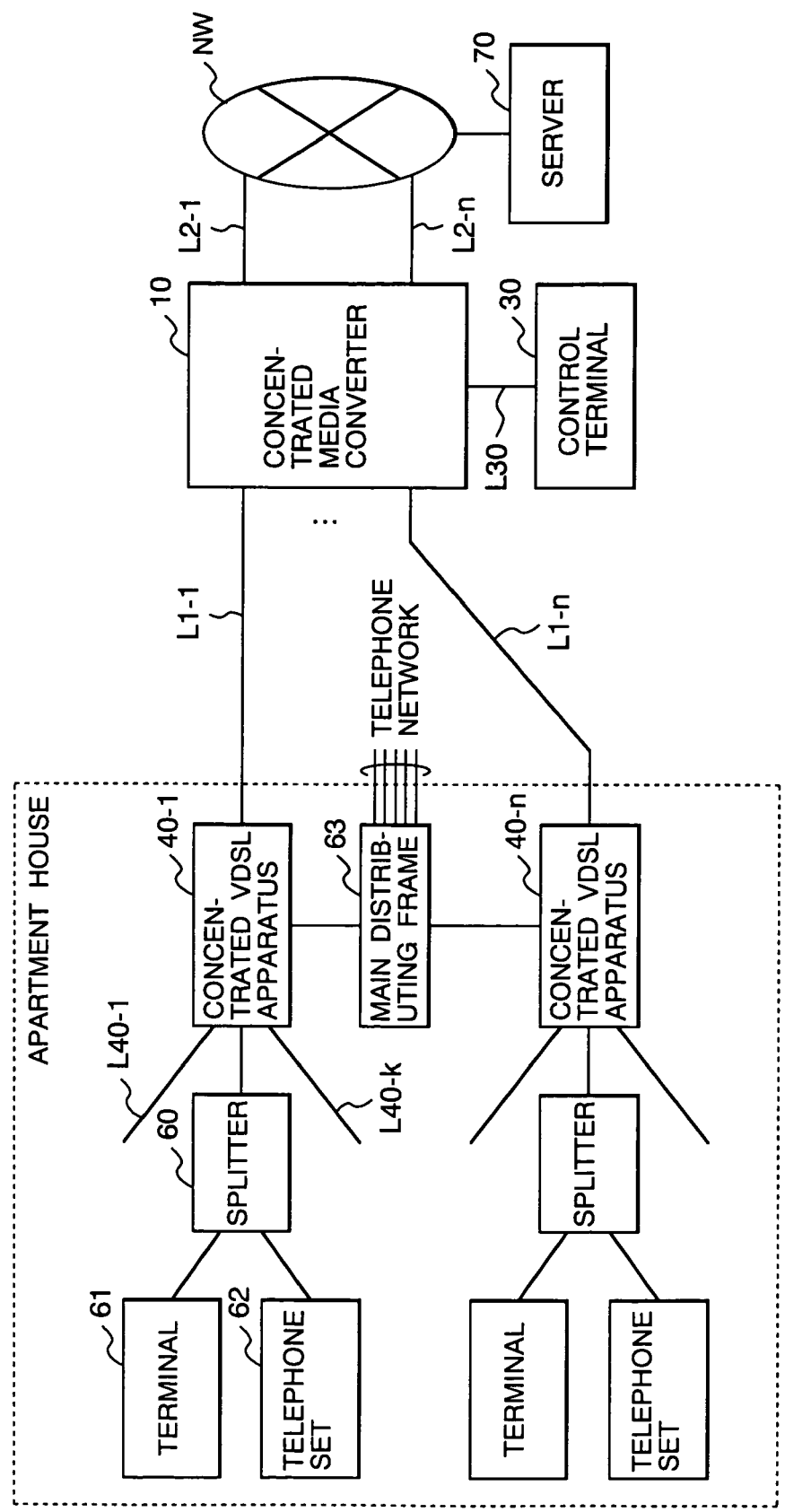
FIG. 1 shows one example of a transmission system to which the present invention is applied.

By referring to the drawings, one embodiment of a transmission system according to the present invention will now be described.

FIG. 1 shows an example of a transmission system comprising a plurality of concentrated VDSL apparatuses 40 (40-1 to 40-$n$) and a concentrated MC 10. Each VDSL apparatus 40 accommodates a plurality of subscriber lines L40-1 to L40-$k$ and each subscriber line L40 is connected to a terminal 61 and a telephone set 62 via a splitter 60.

Each telephone set 62 is connected to a main distributing frame (MDF) 63 via the splitter 60 and the VDSL apparatus 40 and accommodated into a packet switch of a telephone network via the MDF 63. Each terminal 61 is connected to a high-speed transmission line (optical fiber) L1 (L1-1 to L1-$n$) via the splitter 60 and the VDSL apparatus 40 so that it can access a server on a network NW via the concentrated MC 10. Although a number of servers would actually exist on the network and each terminal can communicate with any server, one server 70 is shown here as a representative of them for simplification. The embodiment of the present invention will be described on the assumption that each terminal 61 communicates with the server 70 on the network NW, using Ethernet frames. However, communication frames that are relayed by the concentrated MC are not limited to Ethernet frames.

A control terminal 30 is connected to the concentrated MC 10 to monitor the status of the concentrated VDSL apparatuses. By entering a command from the control terminal 30, an operator can transmit a maintenance frame (control message) to each concentrated VDSL apparatus 40 via the concentrated MC 10. By receiving, via the concentrated MC 10, various types of maintenance frames transmitted from the concentrated VDSL apparatuses 40, the operator can monitor the statuses of each of the concentrated VDSL apparatuses 40 through the control terminal 30. The control terminal 30 is notified of failure information and traffic status information of the concentrated MC 10 besides maintenance frames received from the concentrated VDSL apparatuses 40.

When transmitting a control request or download data to a particular concentrated VDSL apparatus 40, the operator supplies a control message to a control board 20 (which will be described later with FIG. 3) of the concentrated MC 10 via the control terminal 30. The control message is comprised of an identifier (address) of the concentrated VDSL apparatus, message type (control/download distinction), and a data part including control information or download data.

FIGS. 2A and 2B illustrate the format of Ethernet frames to be communicated between the concentrated MC 10 and each of the concentrated VDSL apparatuses 40.

As show in FIG. 2A, the Internet frame for main signal transmission is comprised of a payload 80, header 81 and CRC 82. The header 81 includes, following a preamble and a frame start delimiter, a destination address, source address and protocol type in accordance with the Ethernet frame format. The payload 80 can include variable-length data. In the case of an Ethernet frame with padding, the header 81 includes data length after the protocol type and the payload 80 includes padding data in addition to user data.

FIG. 2B illustrates an Ethernet frame for maintenance data. This frame includes a control request issued by the control terminal 30 or notification information issued from each concentrated VDSL apparatus 40 or the concentrated MC 10. The Ethernet frame for maintenance includes a 2-byte TAG field 83 between the header 81 and payload 80.

In this embodiment, the TAG field 83 is comprised of 3-byte priority information (PRI) 831, 1-bit Canonical Format Identifier (CFI) 832 indicating the format type, and 12-bit LAN identifier (VID) 833. As the PRI 831, one of values 0 to 7 is set to indicate a priority level of the frame. The higher the set value, the higher priority level is given to the frame. In this embodiment, each maintenance frame includes a value of "7" indicating the highest priority level as the PRI 831, and a fixed value of "0" as the CFI 832. The LAN identifier (VID) 833 includes a value in a range of 0 to 4095 to identify a LAN to which the frame belongs. In this embodiment, each maintenance frame includes a fixed value of "4094" as the VID 833.

FIG. 3 shows a configuration of the concentrated MC 10. The concentrated MC 10 comprises a plurality of interface boards 11 (11-1 to 11-n), each of which is provided for each high speed transmission line L1 (L1-1 to L1-n) of optical fiber, and the control board 20 connected to these interface boards. The control terminal 30 is connected to the control board 20 via a signal line L30.

Figure 4:
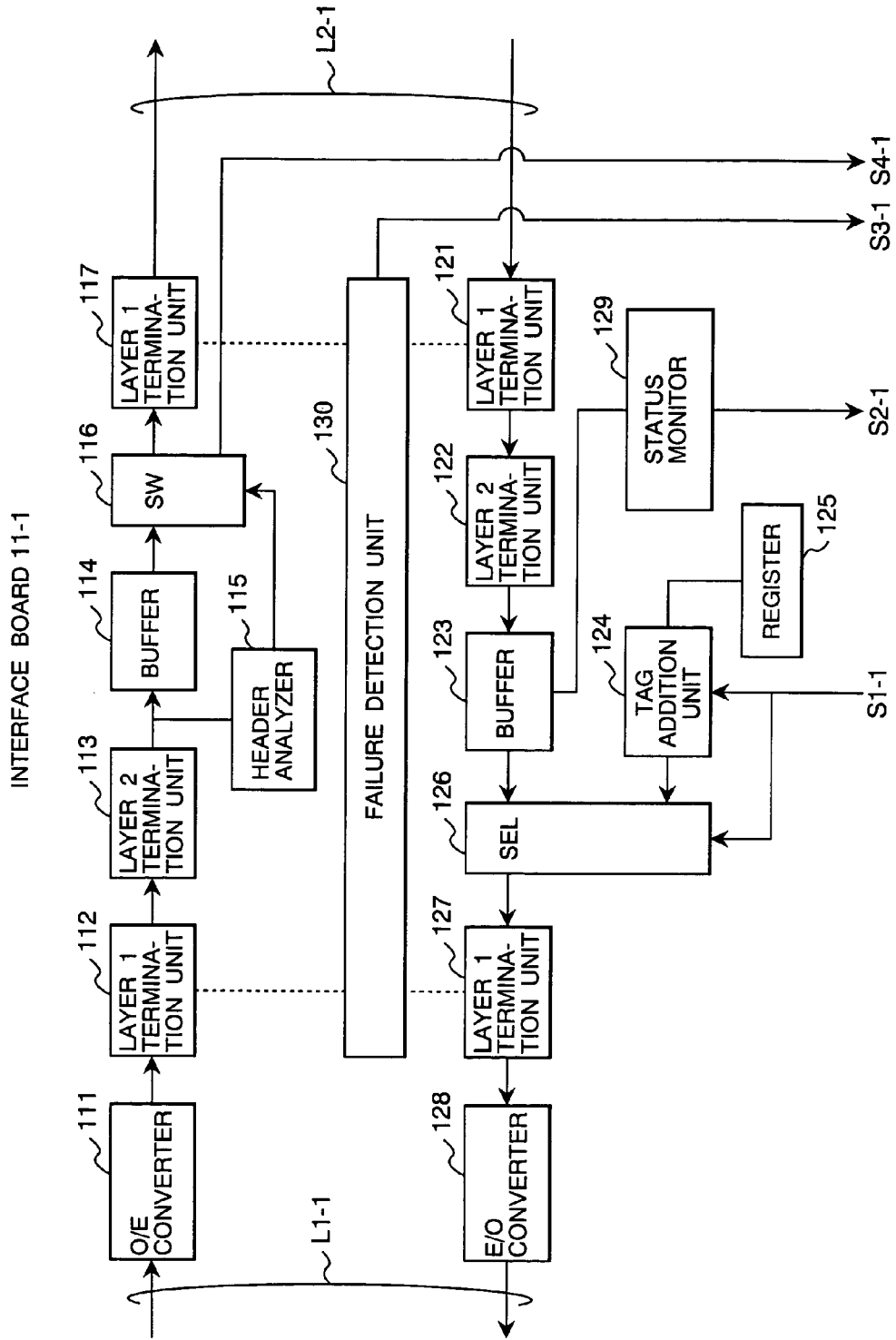
FIG. 4 is a block diagram showing an embodiment of an interface board 11-1 shown in FIG. 3.

FIG. 4 shows an embodiment of an interface board 11-1. Other interface boards 11-2 to 11-n have the same configuration as shown here. The interface board 11-1 comprises an upward signal processing circuit, a downward signal processing circuit, and a failure detection unit 130.

The upward signal processing circuit comprises an O/E converter 111 for converting optical signals received through an high speed transmission line L1-1 into electric signals, a receiving-side layer 1 termination unit 112 for receiving signals output from the O/E converter 111 and performing termination processing for layer 1 (physical layer) of the OSI reference model, a layer 2 termination unit 113 for receiving signals output from the layer 1 termination unit 112 and performing termination processing for layer 2 (MAC layer) of the OSI reference model, a buffer 114 for buffering received frames (Ethernet frames) output from the layer 2 termination unit 113, a header analyzer 115 for analyzing the header of a received frame output from the layer 2 termination unit 113 and determining the type of the received frame, a switch 116 controlled by an output signal from the header analyzer 115, and a transmission-side layer 1 termination unit 117 for converting an Ethernet frame output from the switch 116 into electric signals at the physical layer and transmitting the frame to a connection line L2-1 for the network NW.

Controlled by an output signal from the header analyzer 115, the switch 116 outputs a frame output from the buffer 114 to the layer 1 termination unit 117 if the received frame is a main signal frame (user frame) and routes a frame output from the buffer 114 to a signal line S4-1 if the received frame is a maintenance frame. The maintenance frame is then supplied to the control board 20 through the signal line S4-1.

On the other hand, the downward signal processing circuit comprises a receiving-side layer 1 termination unit 121 connected to the connection line L2-1 for the network NW, a layer 2 termination unit 122 connected to the layer 1 termination unit 121, a buffer 123 for buffering received frames (Ethernet frames) output from the layer 2 termination unit 122, a TAG addition unit 124, a register 125 for storing TAG information, a selector (SEL) 126 which selectively outputs either of a frame output from the buffer 123 and a frame output from the TAG addition unit 124, a transmission-side layer 1 termination unit 127 for converting a frame output from the selector 126 into electric signals at the physical layer, an E/O converter 128 for converting output signals from the layer 1 termination unit 127 into optical signals and transmitting the frame to the high speed transmission line L1-1, and a status monitor 129 connected to the buffer 123.

The TAG addition unit 124 inserts TAG information 83 held by the register 125 to a maintenance frame received from the control board 20 through a signal line S1-1 and outputs the maintenance frame to the selector 126. The register 125 holds the VID value ("4094") indicating that the frame is a maintenance frame, the priority level ("7"), and the CFI value ("0") as the TAG information 83. The selector 126 selects a frame output from the TAG addition unit 124 as long as a maintenance frame is output to the signal line S1-1 and selects, when maintenance frame output stops, a frame output from the buffer 123 to supply the selected frame to the layer 1 termination unit 127. The status monitor 129 monitors the amount of data stored in the buffer 123, generates traffic status information, and periodically sends the status information to the control board 20 through a signal line S2-1. The failure detection unit 130 monitors the states of the layer 1 termination units 112, 117, 121 and 127, generates failure notification information indicating whether interruption of signal transmission in the upward and downward signal processing circuits continues beyond a predetermined period of time, and periodically sends the failure information to the control board 20 through the signal line S2-1.

Figure 5:
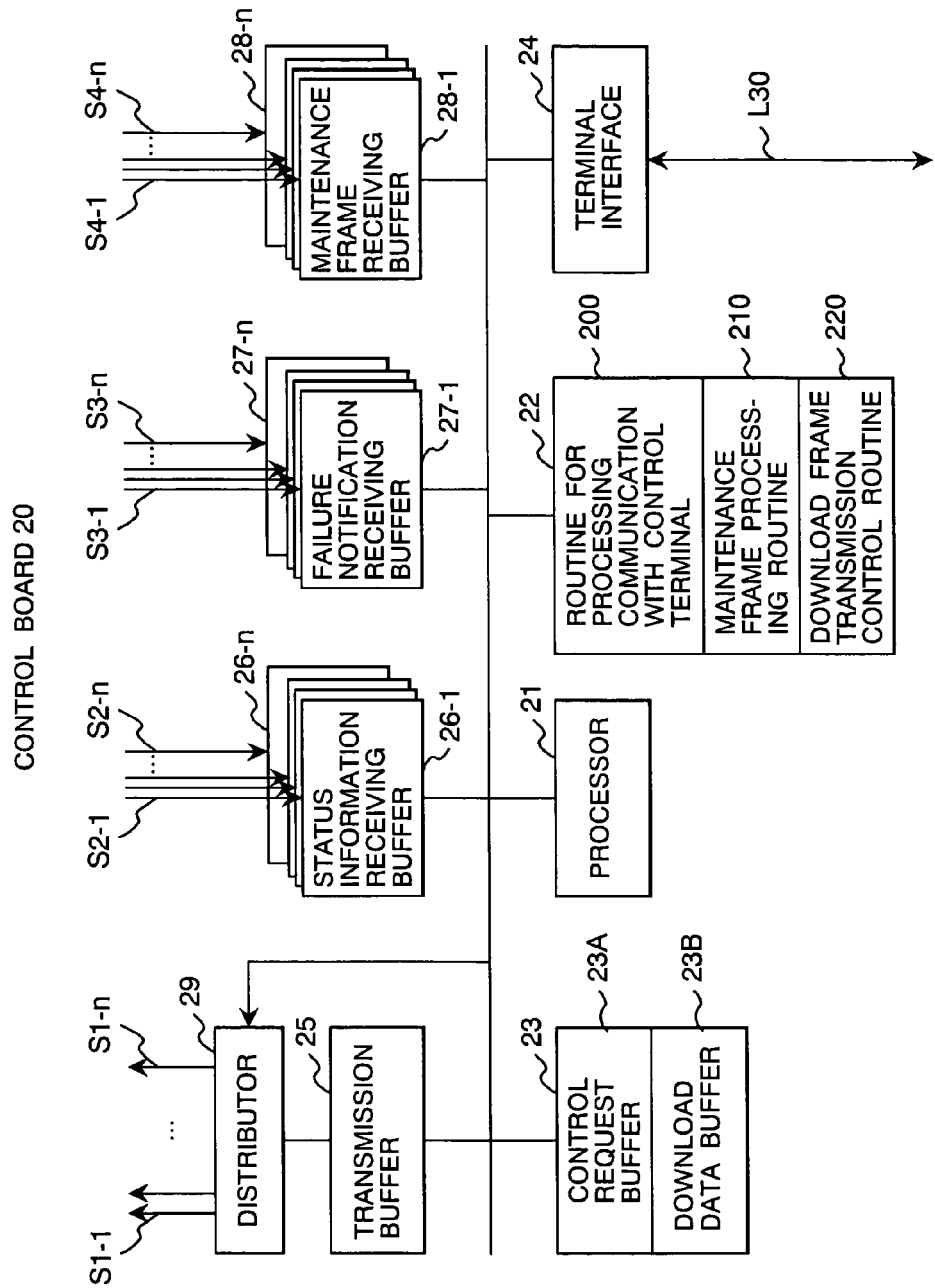
FIG. 5 is a block diagram showing an embodiment of a control board 20 shown in FIG. 3.

FIG. 5 shows an embodiment of the control board 20. The control board 20 is comprised of a processor 21, a program memory 22 in which various programs to be executed by the processor 21 are stored, a data memory 23, a terminal interface 24 for communicating with the control terminal 30, a transmission buffer 25, status information receiving buffers 26 (26-1 to 26-n), failure notification receiving buffers 27 (27-1 to 27-n), maintenance frame receiving buffers 28 (28-1 to 28-n), and a distributor 29. The receiving buffers 27-i, 28-i and 29-i (where i=1 to n) are prepared in association with the interface boards 11-i and these buffers are connected to the interface boards 11-i by signal lines S2-i, S3-i and S4-i, respectively. In the program memory 22, as programs pertaining to the present invention, a routine 200 for processing communication with the control terminal, a maintenance frame processing routine 210, and a download frame transmission control routine 220 are provided. In the data memory 23, a control request buffer 23A for buffering control requests to be transmitted to the concentrated VDSL apparatuses 40 (40-1 to 40-n) and a download data buffer 23B for buffering download data (firmware) to be selectively transmitted to one of the concentrated VDSL apparatuses are formed.

The processor 21 communicates with the control terminal 30 according to the routine 200 and executes frame transmission operation in response to a command from the control terminal 30. Upon receiving a control message including control request to be transmitted to one of the concentrated VDSL apparatuses 40 (40-1 to 40-n) from the control terminal 30, the processor 21 stores the received control request into the control request buffer 23A and outputs the control request to the transmission buffer 25 after converting it into an Ethernet frame. If a number of control requests have been issued from the control terminal 30, a transmission queue of the control requests is formed in the control request buffer 23A.

An Ethernet frame read out from the transmission buffer 25 is output by the distributor 29 to a signal line S1-i (where i=1 to n) specified in accordance with the destination address of the frame. A maintenance frame output to the signal line S1-i is input to the TAG addition unit 124 of the interface board 11-i shown in FIG. 4 and forwarded to the selector 126 in the form of tagged frame shown in FIG. 2B. After processed through the layer 1 termination unit 127 and the E/O converter 128, the maintenance frame is transmitted to the high-speed transmission line L1-i connected to the interface board 11-i.

The processor 21 sends a maintenance frame from a concentrated VDSL apparatus 40 (40-1 to 40-n) read out from a maintenance frame receiving buffer 28 to the control terminal 30 through the signal line L30. Similarly, the processor 21 sends failure notification information for an interface board 11 (11-1 to 11-n) in the concentrated MC read out from a failure notification receiving buffer 27 (27-1 to 27-n) to the control terminal 30 through the signal line L30. The maintenance and notification information is displayed on the display screen of the control terminal 30, so that the operator can monitor the statuses of the concentrated MC 10 and the concentrated VDSL apparatus 40.

Figure 6:
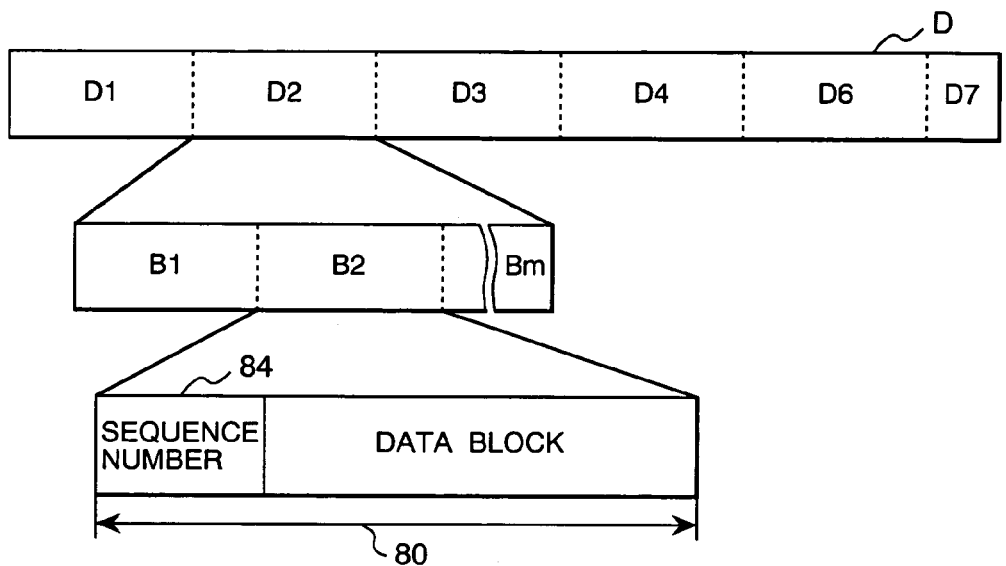
FIG. 6 is a diagram to explain the relation between firmware to be downloaded from the concentrated MC 10 to a concentrated VDSL apparatus and download frames.

The control terminal 30 divides firmware data D to be downloaded to one of concentrated VDSL apparatuses 40 into a plurality of fixed-length blocks D1, D2, etc. and sends the firmware block by block to the control board 20 as is illustrated in FIG. 6. One block has a size of, for example, a maximum data length (65,535 bytes) in accordance with IP protocol. The processor 21 on the control board 20 further divides each of firmware blocks received from the control terminal 30 into fixed-length data sub-blocks B1, B2, etc., assigns sequence numbers to the data sub-blocks, and sets the data sub-block having a sequence number in the payload 80 of each Ethernet frame.

Because the payload 80 of an Ethernet frame has a maximum length of 1500 bytes, 44 to 45 times of Ethernet frame transmissions are required to download one block of firmware received from the control terminal 30. Therefore, if the size of the firmware to be downloaded is, for example, 1M bytes, about 700 times of Ethernet frame transmissions are required to download the firmware.

When the processor receives one block of download data from the control terminal 30, after storing this block data into the download data buffer 23B, generates download frames for each data sub-block (B1, B2, etc.), according to the download frame transmission control routine 220 which will be detailed with reference to FIG. 10, and transmits the download frames to the appropriate concentrated VDSL apparatus 40. If a new control request has been received from the control terminal 30 during the execution of the download frame transmission control routine 220, processing for communication with the control terminal is preferentially performed. That is, the processor 21 adds the new control request to the control request buffer 23A and transmits a maintenance frame including the control request read out from the control request buffer 23A.

A feature of the present invention resides in that the download frame transmission control routine 220 determines the timing to transmit a download frame, depending on whether a control request (maintenance frame) awaiting transmission exists and on the downward traffic status in each interface board, which is given by the status information receiving buffers 26 (26-1 to 26-n), so that the transmission of a huge amount of frames for the above firmware download does not obstruct the traffic of main signals and maintenance frames for control request.

Figure 7:
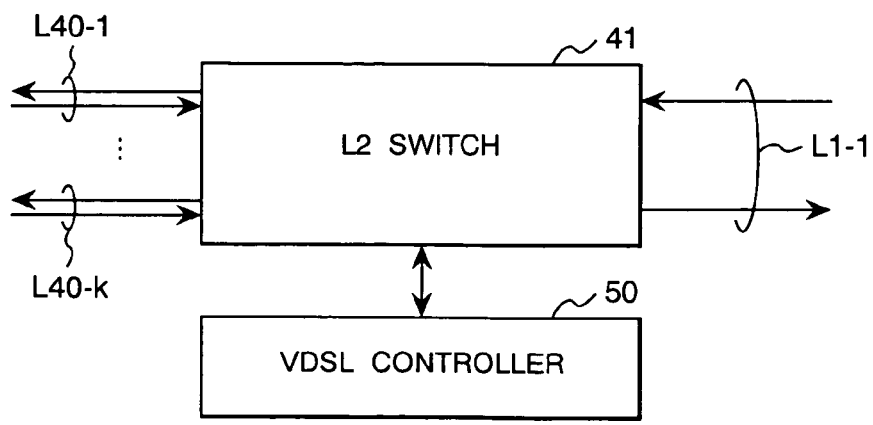
FIG. 7 shows a configuration of a concentrated VDSL apparatus 40-1 shown in FIG. 1.

A concentrated VDSL apparatus 40-1 comprises an L2 switch 41 and a VDSL controller 50 as shown in FIG. 7. Other concentrated VDSL apparatuses have the same configuration as shown here.

Figure 8:
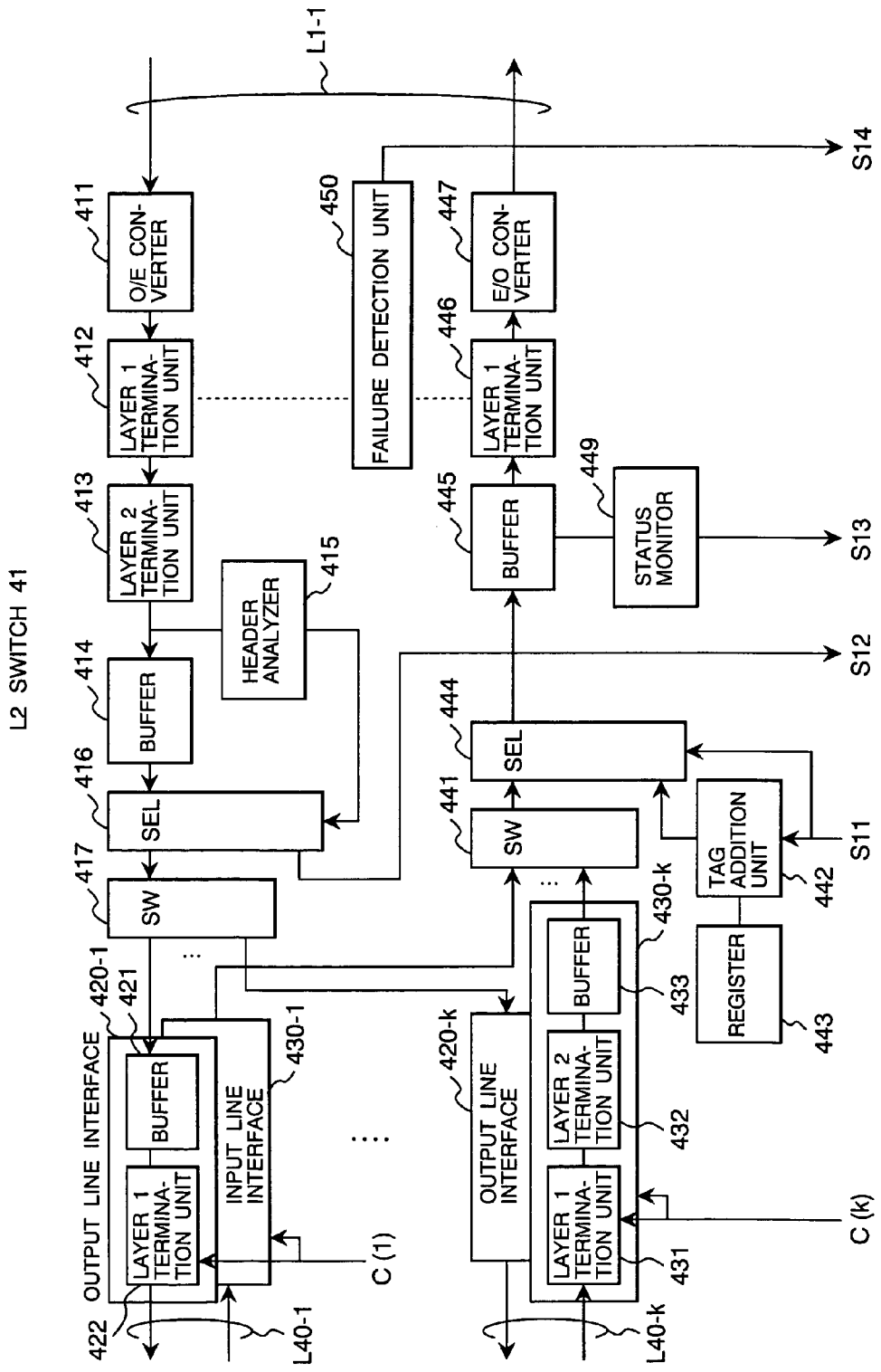
FIG. 8 is a block diagram showing an embodiment of an L2 switch 41 shown in FIG. 7.

FIG. 8 shows an embodiment of the L2 switch 41. The L2 switch 41 comprises a downward signal processing circuit, an upward signal processing circuit, and a failure detection unit 450.

The downward signal processing circuit is comprised of an O/E converter 411 for converting optical signals received through an high speed transmission line L1-1 into electric signals, a receiving-side layer 1 termination unit 412 for receiving signals output from the O/E converter 411 and performing termination processing for layer 1 (physical layer) a layer 2 termination unit 413 for receiving signals output from the layer 1 termination unit 412 and performing termination processing for layer 2 (MAC layer), a buffer 414 for buffering received frames (Ethernet frames) output from the layer 2 termination unit 413, a header analyzer 415 for analyzing the header of a received frame output from the layer 2 termination unit 413 to determine the type of a received frame, a selector 416 which is controlled by an output signal from the header analyzer 415, a plurality of output line interfaces 420-i (where i=1 to k) connected to output lines of the subscriber lines L40-i (where i=1 to k), respectively, and a switching unit 417 for routing an Ethernet frame output from the selector 416 to one of output line interfaces 420 specified by the destination address of the frame.

According to an output signal from the header analyzer 415, the selector 416 outputs a frame from the buffer 414 to the switching unit 417 if the received frame is a main signal frame (user frame) and routes a frame from the buffer 414 to the VDSL controller 50 through a signal line S12 if the received frame is a maintenance frame or a download frame. Each of output line interfaces 420-i comprises a buffer 421 for buffering frames received from the switching unit 417 and a transmission-side layer 1 termination unit 422 for converting an output frame from the buffer 421 to signals to be transmitted to the subscriber line L40-i connected to the interface.

On the other hand, the upward signal processing circuit is comprised of a plurality of input line interfaces 430-i (where i=1 to k) connected to input lines of the subscriber lines L40-i (where i=1 to k), respectively, a switching unit 441 to which the plurality of input line interfaces 430 are connected, a TAG addition unit 442, a register 443 connected to the TAG addition unit 442, a selector 444 for selectively outputting either of a frame from the switching unit 441 and a frame from the TAG addition unit 442 to a buffer 445, a layer 1 termination unit 446 connected to the buffer 445, an E/O converter 447 for converting signals output from the layer 1 termination unit 446 into optical signals and transmitting the m to the high speed transmission line L1-1, and a status monitor 449 for monitoring the amount of data stored in the buffer 445.

The status monitor 449 generates traffic status information indicating a result of monitoring the buffer 445 and periodically sends the traffic status information to the VDSL controller 50 through a signal line S13.

Each of input line interfaces 430-i comprises a receiving-side layer 1 termination unit 431 for performing layer 1 termination processing on signals received through the subscriber line L40-i connected to the interface, a receiving-side layer 2 termination unit 432 connected to the layer 1 termination unit 431, and a buffer 433 for buffering received frames (Ethernet frames) output from the layer 2 termination unit 432.

The TAG addition unit 442 inserts TAG held by the register 443 into a notification frame delivered by the VDSL controller 50 through a signal line S11 and outputs the notification frame having the format shown in FIG. 2B to the selector 444. The selector 444 selects a frame from the TAG addition unit 442 as long as a notification frame is output to the signal line S11 and selects, when notification frame output stops, a frame from the switch 441, and supplies the selected frame to the buffer 445. While the selector 444 selects the output from the switching unit 441, the switching unit 441 accesses the input line interfaces 430-1 to 430-k in order cyclically and outputs transmission frames from terminals 61 stored in the buffer 433 of each interface sequentially to the selector 444.

The failure detection unit 450 monitors the states of the layer 1 termination units 412 and 446, generates failure notification information indicating whether interruption of signal transmission in the upward and downward signal processing circuits continues beyond a predetermined period of time, and periodically sends the failure notification to the VDSL controller 50 through a signal line S14.

Figure 9:
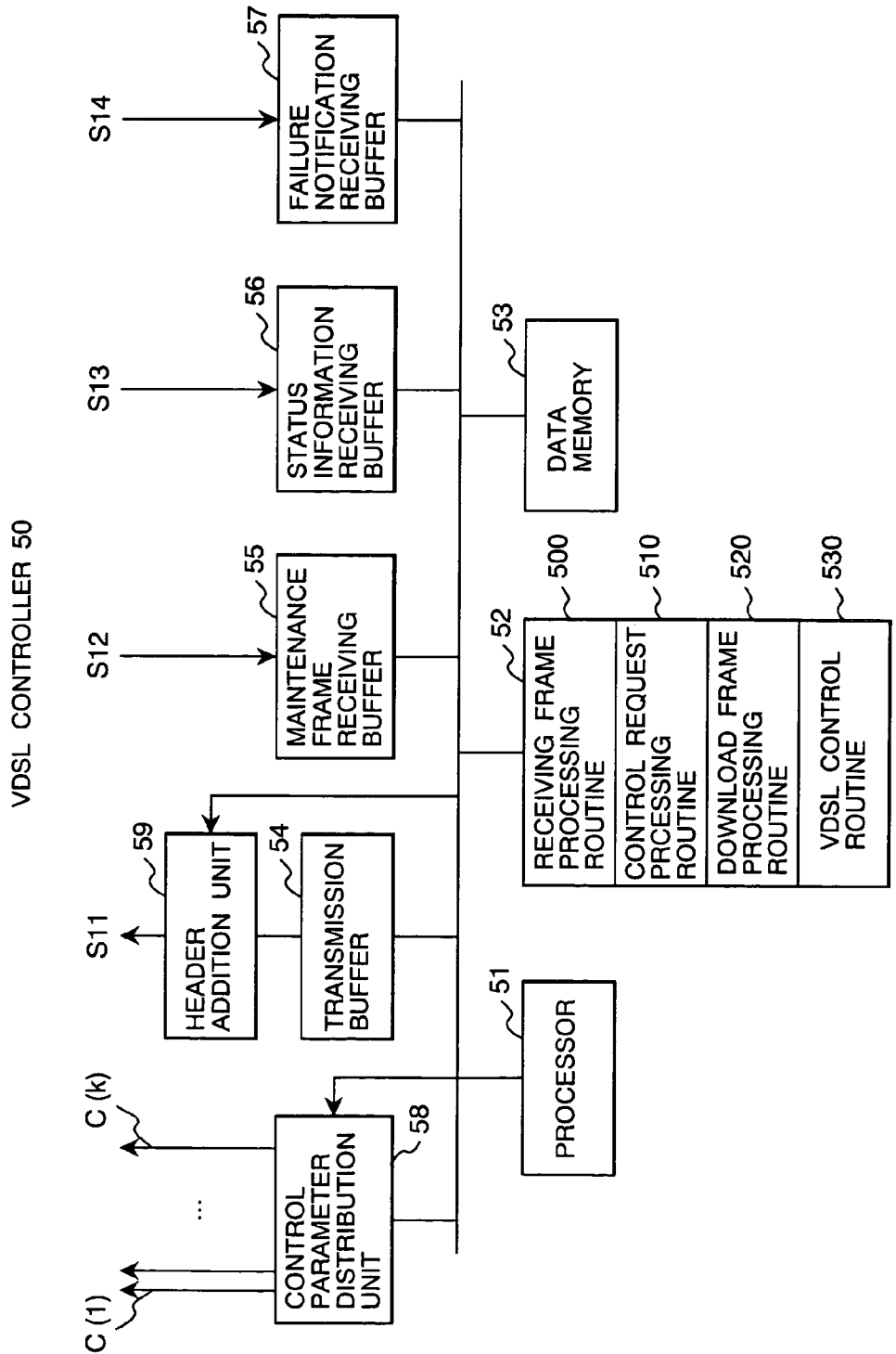
FIG. 9 is a block diagram showing an embodiment of a VDSL controller 50 shown in FIG. 7.

FIG. 9 shows an embodiment of the VDSL controller 50. The VDSL controller 50 is comprised of a processor 51, a program memory 52 in which various programs to be executed by the processor 51 are stored, a data memory 53, a transmission buffer 54, a maintenance frame receiving buffer 55, a status information receiving buffer 56, a failure notification receiving buffer 57, a control parameter distribution unit 58, and a header addition unit 59 connected to the transmission buffer 54.

The maintenance frame receiving buffer 55, status information receiving buffer 56, and failure notification receiving buffer 57 are connected to the signal lines S12, S13, S14 shown in FIG. 8, respectively. The header addition unit 59 adds an Ethernet header to a response message that the processor 51 has output to the transmission buffer 54, thereby to output to the signal line S11 a maintenance frame addressed to the control terminal connected to the concentrated MC. The maintenance frame is input to the TAG addition unit 442 shown in FIG. 8 and transmitted to the concentrated MC 10 as an Ethernet frame with a tag.

In the program memory 52, as programs pertaining to the present invention, a receiving frame processing routine 500, a control request processing routine 510, a download frame processing routine 520, and a VDSL control routine 530 are provided.

According to the receiving frame processing routine 500, the processor 51 reads out a received frame from the maintenance frame receiving buffer 55, executes the control request processing routine 510 if the received frame is a control request frame, and executes the download frame processing routine 520 if the received frame is a download frame.

The control request processing routine 510 generates a response message depending on a control request received, for example, a notification message including failure notification information read out from the failure notification receiving buffer 57 and outputs the message to the transmission buffer 54. Further, the control request processing routine 510 periodically reads out failure notification information from the failure notification receiving buffer 57, autonomously generates a notification message including the failure notification information when failure has occurred, and outputs the message to the transmission buffer 54.

The download frame processing routine 520 stores data sub-blocks of downloaded firmware extracted from received frames, into the data memory 53, and generates an ACK message to outputs it to the transmission buffer 54.

If a received frame is a control request for instructing the VDSL controller 50 to execute the firmware downloaded, the VDSL control routine 530 selectively changes the properties of the input line interfaces 420-i and the output line interfaces 430-i (where i=1 to n), according to the downloaded firmware stored in the data memory 53. The property of interface can be changed by updating the values of specific control parameters in the input/output line interfaces to be subject to properties change via the control parameter distribution unit 58. With this firmware downloading, for example, the data transmission rate of a subscriber line, modulation/demodulation characteristics of the line interfaces, and so on can be changed.

Figure 10:
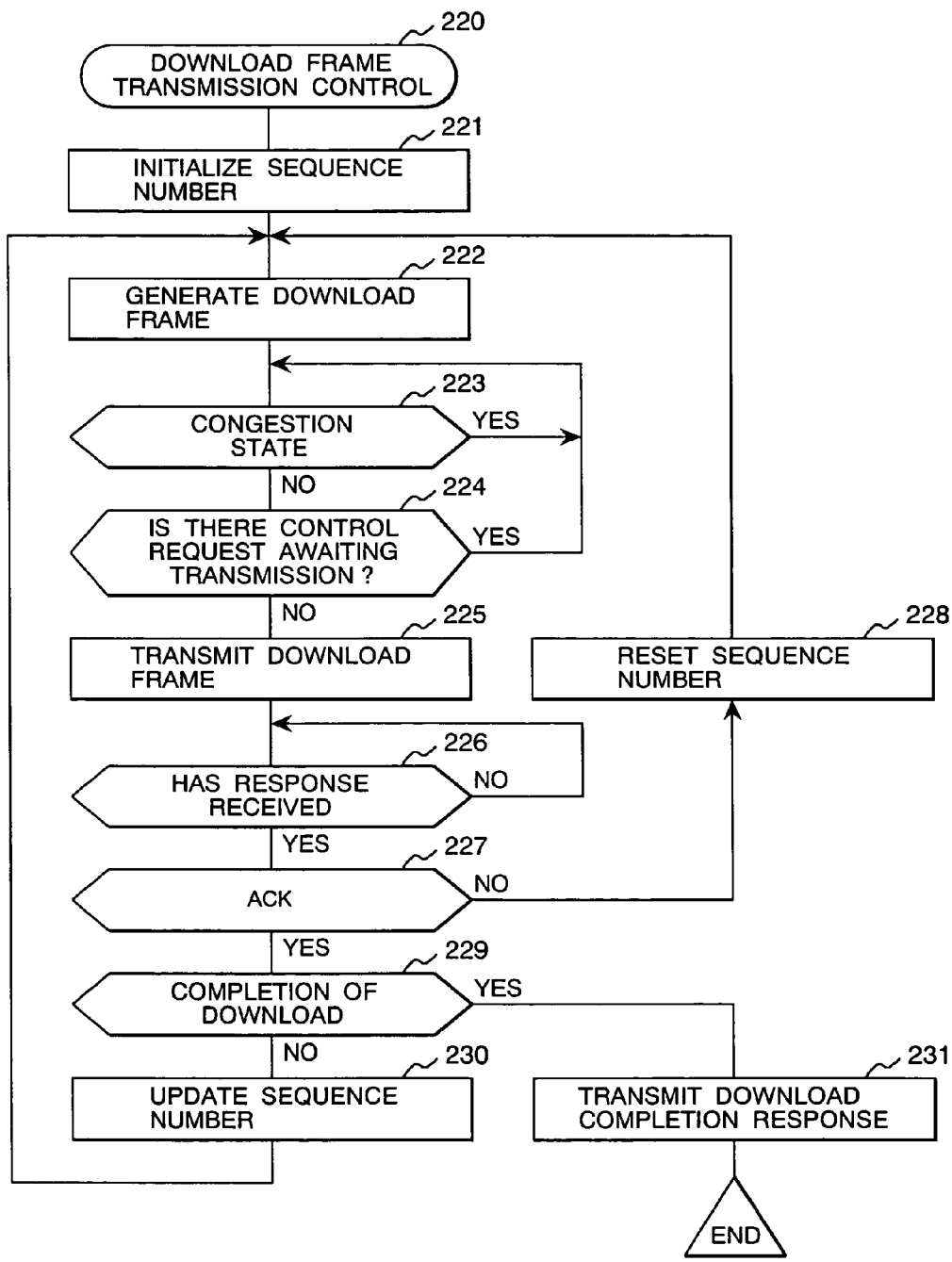
FIG. 10 is a flowchart illustrating an embodiment of a download frame transmission control routine 220 to be executed by the processor on the control board 20.

FIG. 10 is a flowchart illustrating an embodiment of the download frame transmission control routine 220 to be executed by the processor 21 mounted on the control board 20 of the concentrated MC. Here, it is assumed that the sequence number of each data sub-blocks is initialized for each of firmware blocks D1, D2, etc. shown in FIG. 6, received from the control terminal 30.

When executing the download frame transmission control routine 220, the processor 21 initializes a sequence number to be applied to the first data sub-block (step 221), and generates a download frame of Ethernet format that includes a fixed-length data sub-block read out from the buffer 23B and the sequence number 84 in the payload 80 (222). After that, by reading out status information from the status information receiving buffer 26-$j$ specified by an interface number j corresponding to the interface board connected to the concentrated VDSL apparatus to which the firmware should be downloaded, the processor 21 determines the status of downward main signal traffic on the corresponding transmission line (223).

If the main signal traffic exceeds a predetermined threshold (congestion state), the processor 21 waits for traffic recovery from the congestion state. If the main signal traffic is not in the congestion state, the processor 21 checks a control request awaiting transmission in the control request buffer 23A (224). If there is a control request awaiting transmission, the processor 21 returns to step 223.

Confirming that main signal traffic is not in the congestion state and there is no control request awaiting transmission, the processor 21 outputs the download frame to the transmission buffer 25, instructs the distributor 29 to deliver the download frame to the signal line S1-$j$ (225), and waits for receiving a response frame from the concentrated VDSL apparatus 40-$j$ (226). When a response frame from the concentrated VDSL apparatus 40-$j$ has arrived on the maintenance frame receiving buffer 28-$j$, the processor 21 checks the response message type (227). If the response frame is a retransmission request of a data sub-block, the processor 21 resets the value of the sequence number to that of the data sub-block for which retransmission is requested (228) and repeats the procedure from the steps 222 and subsequent.

If the response frame is ACK, the processor 21 checks whether transmission of one block of download data stored in the buffer 23B has been completed (229). If data to be downloaded remains, the processor 21 updates the sequence numbers (230) and repeats the procedure from the steps 222 and subsequent. When transmission of one block of download data stored in the buffer 23B has been completed, the processor 21 sends a response message indicating download completion to the control terminal 30 (231) and exits this routine.

Figure 11:
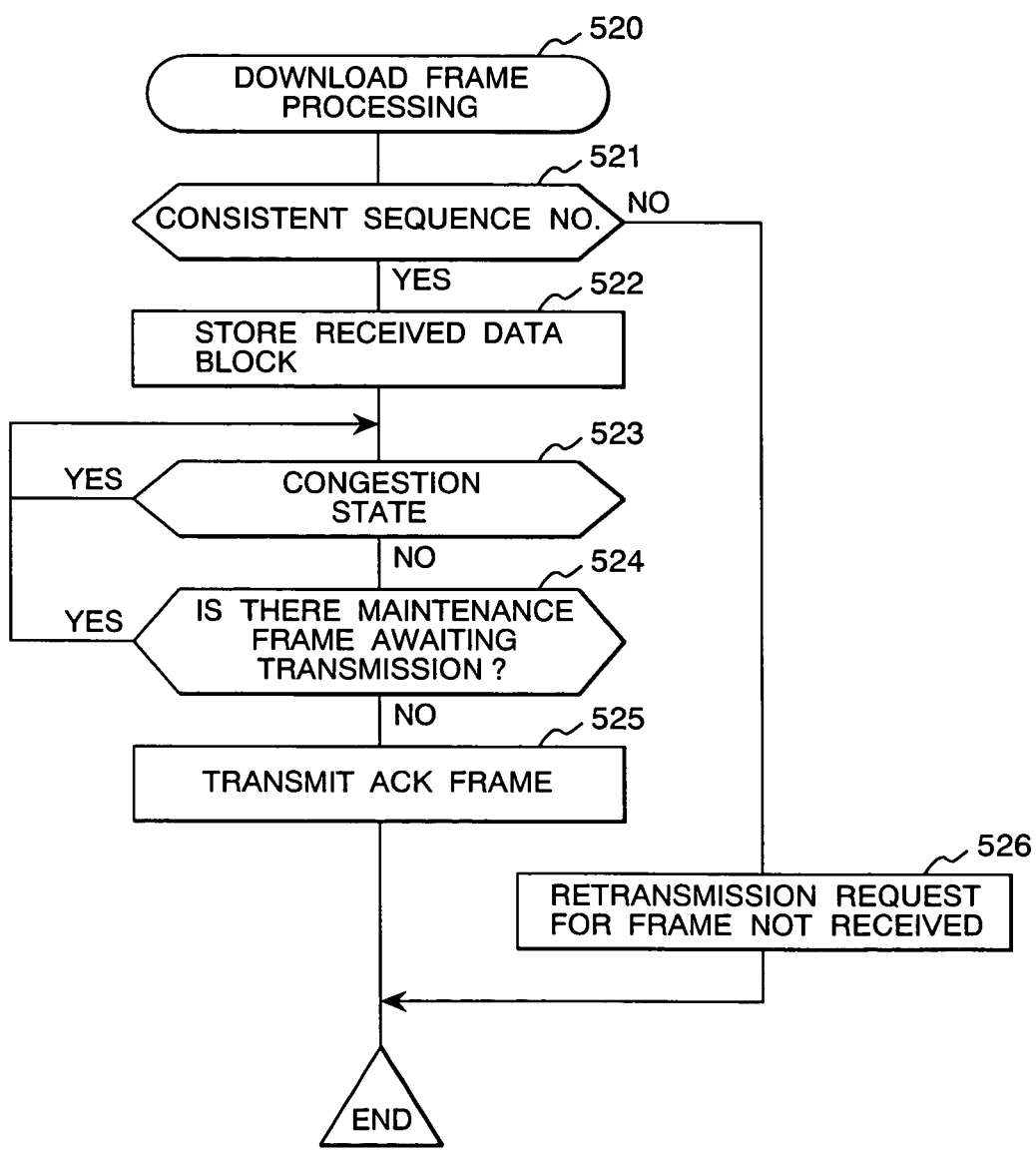
FIG. 11 is a flowchart illustrating an embodiment of a download frame processing routine 520 to be executed by the processor of the VDSL controller 50.

FIG. 11 is a flowchart illustrating an embodiment of the download frame processing routine 520 to be executed by the processor 51 of the VDSL controller 50.

E When executing the download frame processing routine 520, the processor 51 checks the sequence number of a downloaded frame received (step 521). If the sequence number is other than the initial number and does not succeed to the sequence number assigned in the last received download frame, the processor 51 generates a retransmission request message in which a missing sequence number for the frame not received is specified and outputs the message to the transmission buffer 54 (526).

If the sequence number is consistent, the processor 51 stores download data extracted from the received frame into an area allocated for firmware download in the data memory 53 (522). After storing the sequence number, the processor 51 reads out status information from the status information receiving buffer 56-$j$ and checks the status of upward main signal traffic on the transmission line (523). If the main signal traffic exceeds a predetermined threshold (congestion state), the processor 51 waits for traffic recovery from the congestion state. If the main signal traffic is not in the congestion state, the processor 51 checks a maintenance frame awaiting transmission in the transmission buffer 54 (524). If there is a maintenance frame awaiting transmission, the processor 51 returns to step 523. Confirming that the main signal traffic is not in the congestion state and there is no maintenance frame awaiting transmission, the processor 51 outputs an ACK frame to the transmission buffer 54 and exists this routine.

While the TAG addition unit 124 is installed on each interface board 11 of the concentrated MC 10 in the described embodiment, the control board 20 may be arranged to generate maintenance frames and download frames in the form of a tagged frame and to output them to each interface board 11. In this case, the TAG addition unit 124 shown in FIG. 4 is replaced with a buffer memory. Similarly, in each concentrated VDSL apparatus 40, the header addition unit 59 in the VDSL controller 50 may be provided with the function of adding TAG to a response frame. In this case, the TAG addition unit 442 in the L2 switch 41 shown in FIG. 8 may be replaced with a buffer memory.

What is claimed is:

1. A transmission system comprising:
    a plurality of concentrated subscriber line transmission apparatuses, each accommodating a plurality of user terminals; and
    a relaying apparatus located between said concentrated subscriber line transmission apparatuses and a communication network,
    wherein said relaying apparatus comprises:
    a first buffer memory for buffering control requests to be transmitted to said concentrated subscriber line transmission apparatuses,
    a second buffer memory for buffering download data to be transmitted to one of said concentrated subscriber line transmission apparatuses,
    a control unit for generating a maintenance frame including a control request read out from said first buffer memory, and download frames each including download data read out from said second buffer memory, and transmitting these frames to a specific one of said concentrated subscriber line transmission apparatuses selectively,
    wherein said control unit controls the transmission of said download frames, depending on the status of traffic of communication frames being relayed from said communication network toward said specific one of concentrated subscriber line transmission apparatuses and on the buffering status of control requests awaiting transmission in said first buffer memory, and
    an interface board for relaying communication frames between said concentrated subscriber line transmission apparatuses and the communication network, and a control board connected to said interface board,
    wherein said first and second buffer memories and said control unit are mounted on said control board,
    wherein said interface board comprises:
    an upward signal processing circuit for relaying upward communication frames from said concentrated subscriber line transmission apparatuses to said communication network,
    a downward signal processing circuit for relaying downward communication frames from said communication network to said concentrated subscriber line transmission apparatuses, and
    a status monitor for detecting status of traffic of downward communication frames, and
    wherein said control unit determines timing to transmit each of said download frames, depending on the status of traffic detected by said status monitor and on the buffering status of control requests awaiting transmission in said first buffer memory and delivers the download frame to said downward signal processing circuit.

2. The transmission system according to claim 1, wherein said upward signal processing circuit on said interface board includes a switching unit for transferring a response frame received from said concentrated subscriber line transmission apparatuses to said control board, and
    wherein said control unit awaits receiving a response frame transmitted from one of said concentrated subscriber line transmission apparatuses in response to a download frame previously transmitted thereto and determines the timing to transmit a next download frame after the response frame has been received.

3. The transmission system according to claim 1, wherein said downward signal processing circuit on said interface board includes a third buffer memory for buffering communication frames received from said communication network and a selector for selectively transmitting communication frames buffered in the third buffer memory and said maintenance frame or download frames passed from said control unit to one of said concentrated subscriber line transmission apparatuses.

4. The transmission system according to claim 1, wherein said relaying apparatus further comprises:
    a plurality of interface boards prepared for each of said concentrated subscriber line transmission apparatuses individually, and
    wherein the control unit mounted on said control board selectively delivers said maintenance frames and download frames to one of said plurality of interface boards.

5. The transmission system according to claim 4, further comprising:
    a control terminal connected to said relaying apparatus,
    wherein control requests and download data output from said control terminal are buffered into said first and second buffer memories, respectively.

6. The transmission system according to claim 4, wherein said control terminal divides firmware to be installed on said specific one of concentrated subscriber line transmission apparatuses into a plurality of blocks and outputs firmware data block by block as said download data.

* * * * *